United States Patent

Lomoelder et al.

[11] Patent Number: 5,837,795
[45] Date of Patent: Nov. 17, 1998

[54] SOLVENT-FREE HEAT-CURING ONE-COMPONENT COATING MATERIALS

[75] Inventors: Rainer Lomoelder, Muenster; Peter Speier, Marl, both of Germany

[73] Assignee: Huels Aktiengesellschaft, Marl, Germany

[21] Appl. No.: 917,194

[22] Filed: Aug. 25, 1997

[30] Foreign Application Priority Data

Sep. 4, 1996 [DE] Germany ............... 196 35 771.3

[51] Int. Cl.$^6$ .................................................. C08G 18/10
[52] U.S. Cl. .................. 528/62; 528/73; 427/389.7; 428/425.6
[58] Field of Search .............. 528/73, 62; 427/389.7; 428/425.6

[56] References Cited

U.S. PATENT DOCUMENTS 4,136,092  1/1979  Jackle et al. .................. 528/60
5,252,683  10/1993  Murata et al. .................. 525/458

FOREIGN PATENT DOCUMENTS 0 025 992  4/1981  European Pat. Off. .
2 200 752  7/1972  Germany .
2 364 157  7/1974  Germany .
41 11 715  10/1991  Germany .

*Primary Examiner*—Rachel Gorr
*Attorney, Agent, or Firm*—Oblon, Spivak, McClelland, Maier & Neustadt, P.C.

[57] ABSTRACT

A heat-curing 1-component coating material having a viscosity at 60°C. of 1000–50,000 mPas, containing A) 85–96% by weight of at least one isocyanate prepolymer containing isocyanurate groups and urethane groups, B) 4–12% by weight of finely divided melamine having a mean particle diameter of 1–30 μm, and C) 0–3% by weight of auxiliaries.

10 Claims, No Drawings

SOLVENT-FREE HEAT-CURING ONE-COMPONENT COATING MATERIALS

BACKGROUND OF THE INVENTION

1. Field of the Invention

The present invention relates to solvent-free heat-curing one-component coating materials.

2. Description of the Background

Solvent-free heat-curing one-component coating materials for coating glass are known.

DE-A 23 64 157 describes the use of urethane prepolymers having at least two isocyanate groups and including a solid substance which is capable of reacting with isocyanates at high temperatures. Polyols used to form the urethane prepolymer are linear polyester- and polyetherdiols and low molecular weight chain extenders such as butanediol, trimethylhexanediol or low molecular weight branching components such as trimethylolpropane (TMP). Diisocyanates are exclusively mentioned as isocyanate component.

EP-AO 025 992 and EP-A 0 025 994 likewise describe the use of coating systems based on isocyanate prepolymers and, dispersed therein, solid 2,4,6-triamino-1,3,5-triazine (melamine) as heat-activatable reactants for the coating of glass bottles. The isocyanate prepolymer is prepared using polyol components based on polyesters or polylactones having a functionality≧2, and selected diisocyanates. An essential feature of these applications is the branching oligomerization of the diisocyanates with TMP.

All of these applications share the features that diisocyanates are exclusively used for preparing the prepolymer, and that the oligomerization and/or branching of the diisocyanate component is accomplished by urethane formation. When applied to glass substrates and cured, the coating systems lead to outstanding protection against shattering and splintering of the glass. The coatings are cured at temperatures>180° C., although shorter curing times can be obtained at temperatures>220° C.

A disadvantage of all of the above-mentioned variants is that the coatings require a prolonged period, generally several days, after heat curing in order to develop a high level of resistance to washing liquors, which is something that is required, for example, for bottles for drinks. The deficient washing-liquor resistance is evident from attack on the surface of the coatings, which is irreversible and makes the bottles unusable. Storing the coated bottles for a number of days, under conditions which in some circumstances cannot be clearly defined, prior to subjecting them to the action of washing liquors, is undesirable and economically unacceptable.

SUMMARY OF THE INVENTION

One object, therefore, of the present invention was to overcome the disadvantage of the liquor resistance only slowly developing subsequent to heat curing, without adversely affecting the established mechanical properties of the coating, with a new solvent-free heat-curing coating material.

It has surprisingly been found that the use of polyisocyanates containing isocyanurate groups to prepare isocyanate prepolymers, instead of a combination of short-chain extenders or short-chain branching triols and diisocyanates, overcomes the abovementioned disadvantages while retaining the established set of mechanical properties.

DETAILED DESCRIPTION OF THE INVENTION

The present invention accordingly provides a heat-curing one-component coating material preferably having a viscosity at 60° C. of 1000–50,000 mPas, comprising A) 85–96% by weight of at least one isocyanate prepolymer containing isocyanurate groups and urethane groups, B) 4–12% by weight of melamine preferably being finely divided and having a mean particle diameter of 1–30 μm, and C) 0–3% by weight of auxiliaries.

Coating systems of the invention are suitable for coating glass, especially glass bottles, and are particularly useful at temperatures of 180°–300° C., it being possible to pretreat the glass with an adhesion promoter in order to improve adhesion.

The novel coating material of the invention is prepared using polyisocyanates that contain isocyanurate groups. Such polyisocyanates can be obtained by catalytic trimerization, which in the prior art is accomplished using catalysts and conditions as described, for example, in Journal for Prakt. Chemie, 336 (1994), 185–200, in DE-A 29 16 201 or in DE-P 26 31 733, all incorporated herein by reference. The crude products, containing monomeric diisocyanate, can be demonomerized by thin-film distillation, although the crude products are also suitable for preparing the novel invention coating material. In addition, it is also possible to employ, as polyisocyanates containing isocyanurate groups, products of a trimerization process of diisocyanate mixtures, as described in DE-A 30 33 860 (incorporated herein by reference), for example.

The demonomerized products obtained from the trimerization, or else the undistilled crude products, can additionally be combined, to optimize the set of properties of the novel coating composition, with other diisocyanates or with polyisocyanates containing isocyanurate groups.

The diisocyanates customary in polyurethane technology, such as aromatic TDI (Toluylenlediisocyanate) MDI (Diphenylmethanediisocyanate (4,4'; 2,4') or the (cyclo) aliphatic diisocyanates such as H-MDI (4,4'- and 2,4'-dicyclohexylmethane diisocyanate), HDI (hexamethylene diisocyanate), IPDI (isophorone diisocyanate), TMDI (2,2, 4- and/or 2,4,4-trimethylhexamethylene diisocyanate), TMXDI ($\alpha,\alpha$, $\alpha',\alpha'$-tetramethylxylylene diisocyanate), and MPDI (2-methylpentane 1,5-diisocyanate), are suitable for preparing polyisocyanates containing isocyanurate groups, and in this context the aromatic diisocyanates are less preferred owing to their low weather stability and tendency toward yellowing. Particular preference is given to polyisocyanates containing isocyanurate groups based on IPDI.

The polyisocyanates containing isocyanurate groups preferably employed in accordance with the invention for preparing isocyanate prepolymers which contain isocyanurate groups and urethane groups have an NCO content of 16–35% by weight, a mean functionality of 2.4–4 and a content of isocyanurate-based polyisocyanates of 30–100% by weight.

The invention isocyanate prepolymers containing isocyanurate groups and urethane groups can be prepared by reacting the polyisocyanates which contain isocyanurate groups with polyols having a mean functionality of 2–4 and an OH equivalent weight of 100–700, the ratio of OH to NCO groups being 1:2–1:4. The reaction takes place at 20°–120° C., with or without the use of common catalysts of urethane chemistry such as tertiary amines or Sn, Zn or Bi compounds. In a preferred preparation variant, the finely divided melamine is already dispersed in portions of the polyol component. Polyols which can be employed are polyether-, polyester- and polycarbonate-based polyols. In order to establish an optimum set of properties it may be necessary to adjust the mean molecular weight of the polyol component by blending the polyols with low molecular weight as are used for copolyester synthesis.

Polyethers preferred in accordance with the invention are polyadducts of alkylene oxides, such as ethylene oxide, propylene oxide or tetrahydrofuran, using a di- or trifunctional starter molecule such as, for example, water, ethylene glycol, propylene glycol, 1,4-butanediol or trimethylolpropane. However, particular preference is given, from among the group of polyethers, to polytetramethylene ether diols, also in the form of copolymers with caprolactones, as are marketed, for example, under the name poly-THF (BASF AG) or TERATHANE (DuPont).

Polyester polyols according to the invention, for preparing the isocyanate prepolymer containing isocyanurate groups and urethane groups, are preferably copolycondensates of dibasic aliphatic or aromatic carboxylic acids or carboxylic esters and dihydric or polyhydric alcohols. Examples of dicarboxylic acids are succinic acid, glutaric acid, adipic acid, 2,2,4- and 2,4, -ttrimethyladipic acid, azelaic acid, dodecandioic acid, phthalic acid, isophthalic acid., terephthalic acid, while examples of suitable di- or polyhydric alcohols are ethylene glycol, propylene glycol, 1,4-butanediol, 1,6-hexanediol, 3-methylpentanediol, 2,2,4- and 2,4,4-trimethylhexanediol, decanediol, neopentyl glycol, 1,4-bishydroxymethylcyclohexane and trimethylolpropane.

Polycaprolactones as available commercially under the designation TONE (Union Carbide Corp.) or CAPA (Solvay) are also useful polyesters.

Polycarbonates which can be used in accordance with the invention are reaction products of low molecular mass diols with diaryl carbonates, for example diphenyl carbonate, cyclic carbonates or phosgene. Suitable diols are 1,3-propanediol, 1,4-butanediol, 3-methyl-1,5-pentanediol, 1,6-hexanediol, 2,2,4- or 2,4,4-trimethylhexanediol, diethylene glycol, triethylene glycol, tetraethylene glycol or mixtures of these diol components.

Among the polyols which are suitable for preparing the novel isocyanate prepolymer containing isocyanurate groups and urethane groups, particular preference is given to polytetramethylene ether glycols and polyesters.

Should the intended application require it, the coating material may also comprise urea groups in the isocyanate prepolymer. Urea groups are introduced, in accordance with the prior art, through the use of at least difunctional amine compounds during the prepolymer synthesis.

The invention coating material preferably contains 4–12% of finely divided melamine (2,4,6-triamino-1,3,5-triazine) having an average particle diameter of 1–30 μm.

The preparation of the coating composition and the incorporation of the melamine can take place in accordance with the two-stage process or single-stage process described in EP 25 992, 25 994, incorporated herein by reference. In the single stage process, the isocyanate prepolymer containing isocyanurate groups and urethane groups is prepared first of all by reacting the polyols with the polyisocyanate that contains isocyanurate groups, and then finely divided melamine is added. In another variant of the single-stage process, the finely divided melamine is added first of all to the polyisocyanate that contains isocyanurate groups, and then the polyols are added.

It is preferred, however, to make use of the two-stage process, in which first of all an isocyanate prepolymer containing isocyanurate groups and urethane groups is prepared by reacting 30–70% by weight of the particular polyol component with the polyisocyanate that contains isocyanurate groups, and then adding 70–30% by weight of the polyol component, which contains the entire amount of finely divided melamine. Reaction of the polyol with the polyisocyanate is carried out at temperatures between 20°–120° C., the reaction being monitored by way of the titrimetrically determinable NCO content and being conducted until the theoretical NCO content is reached. After the end of the reaction, the coating material can be devolitalized under reduced pressure.

In accordance with the invention the coating material may include up to 3% by weight of auxiliaries as are customary in paints and coatings technology. Auxiliaries include leveling assistants, such as silicones, fluorine-containing compounds such as, for example, FC 430 from 3M, acrylate copolymers, high-boiling components, catalysts as customary in urethane chemistry, for example tertiary amines, Zn carboxylates, Ca carboxylates, SN(II) carboxylates, and dialkyl- or monoalkyl-Sn(IV) carboxylates, for example of acetic acid, 2-ethylhexanoic acid, dodecanoic acid, ricinoleic acid or Bi salts, and also UV absorbers of, for example, the benzotriazole, oxanilide or striazine type, and antioxidants of, for example, the HALS or sterically hindered phenol type, or from the group of the phosphoric esters or phosphorous esters, and also defoamers.

The invention coating material is preferably applied to a substrate at 40°–100° C. by pouring and/or rolling. The substrate (e.g., glass article) can advantageously be pretreated with an adhesion promoter based on organofunctional silanes and can be preheated at 40°–120° C. The coat thicknesses after curing can be 50–350 μm. Curing preferably takes place at temperatures>180° C., more favorably in the temperature range 220°–300° C.

EXAMPLES

The parts indicated in the examples are by weight.

Example 1

49.1 g of the isocyanurate polyisocyanate of isophorone diisocyanate (VESTANAT T 1890, Huls AG) were dissolved with heating in 50.1 g of isophorone diisocyanate. The NCO content of the polyisocyanate that contains isocyanurate groups is 27.4%.

0.003 g of dibutyltin dilaurate was added to 47.9 g of the polyisocyanate that contains isocyanurate groups, and the mixture was heated to 60° C. 27.3 g of a mixture of polytetramethylene ether glycol, MW 1000 and 650 (65:35) was metered in, in portions and with stirring. After this addition, the reaction mixture was held at 60° C. for 1 h until the NCO content was 14% by weight. Then 24.7 g of a mixture of 7.5 g of finely divided melamine having an average particle diameter of 5 μm in 17.4 g of the mixture of polytetramethylene ether glycol 1000 and 650 were added in portions. After this addition, stirring was continued at 60° C. for 2 h until the NCO content is 8.8% by weight.

The viscosity at 60° C. was 9500 mPas.

Comparison Example 0.003 g of dibutyltin dilaurate was added to 44.4 g of isophorone diisocyanate, and the mixture is heated to 65° C. 3.8 g of trimethylolpropane (TMP) was added in portions. After the TMP dissolved completely, the mixture was heated at 95° C. for 1 h and then cooled to 60° C., and 24.9 g of the mixture of polytetramethylene ether glycol 650 and 1000 (35:65) was metered in. Following a post-reaction time of 1 h at 60° C., the NCO content was 14.7%. Subsequently, 26.8 g of a mixture of 8 g of finely divided melamine (mean particle diameter: 5 pm) in 18.9 g of the mixture of polytetramethylene ether glycol 650 and 1000 was added in portions. The mixture was left to post-react at 70° C. for 3 h, after which the NCO content was 8.8% by weight.

The viscosity at 60° C. was 6500 mPas.

The coating materials were applied using a doctor blade to silanized glass plates in such a way that the film thicknesses after curing was 150 μm. Curing took place in a pre-finish oven (rotary plate oven) at 240° C. for 4.5 minutes.

Comparison of mechanical data:

|  | Example 1 | Comparison example |
| --- | --- | --- |
| Elongation at break (%) | 260 | 270 |
| Tear strength (N/mm²) | 26.8 | 29.3 |

Following various storage times the coated plates are stored in a washing liquor (1.6% NaOH, 0.25% additive VR 1220/42, from Henkel-Ecolab) at 80° C. for 3 h, rinsed with tap water and assessed visually after 30 minutes.

| | Timing of liquor test*) | | |
| --- | --- | --- | --- |
| | directly after curing | 1 d after curing | 4 d after curing |
| Example 1 | 2–3 | 1–2 | 1 |
| Comparison example | 5 | 4–5 | 2–3 |

*)Assessment—. 1 = unchanged, 2 = virtually no visible attack, 3 = visible attack, surface cloudy, 4 = severe attack, white surface, 5 = very severe attack The difference between Example 1 and the comparison example indicates the advantageous use of polyisocyanates containing isocyanurate groups instead of a combination of short-chain branching (TMP) and diisocyanates (comparison example) with retention of the mechanical data of the coating.

German patent application 196 35 77.13 filed Sep. 4, 1996, is incorporated herein by reference.

What is claimed as new and desired to be secured by Letters Patent of the United States is:

1. A heat-curing coating material having a viscosity at 60° C. of 1000–50,000 mPas, comprising
   A) 85–96% by weight of at least one isocyanate prepolymer containing isocyanurate groups and urethane groups,
   B) 4–12% by weight of finely divided melamine having a mean particle diameter of 1–30 μm, and
   C) 0–3% by weight of one or more auxiliaries.

2. A heat-curing coating material as claimed in claim 1, wherein the isocyanate prepolymer containing isocyanurate groups and urethane groups is prepared using polyols having a mean functionality of 2–4 and an OH equivalent weight of 100–700 and using polyisocyanates containing isocyanurate groups and having a mean functionality of 2.4–4, a free NCO content of 16–35% by weight and a content of isocyanurate-based polyisocyanates of 30–100% by weight, the ratio of OH and NCO groups in the preparation of A) varying between 1:2 and 1:4, the free NCO content of the coating material being 5–15% by weight, and the ratio of the sum of isocyanate-reactive groups of the melamine and the free isocyanate groups being 1:(0.9–1.3).

3. A heat-curing coating material as claimed in claim 1, wherein the isocyanate prepolymer A is prepared using
   a) polyols from the group of polyester-, polyether- and polycarbonate polyols and
   b) polyisocyanates containing isocyanurate groups and based on (cyclo)aliphatic diisocyanates from the group consisting of H-MDI (4,4'- and 2,4'-dicyclohexylmethane diisocyanate), HDI (hexamethylene diisocyanate), IPDI (isophorone diisocyanate), TMDI (2,2,4- and 2,4,4-trimethylhexamethylene diisocyanate), TMXDI (α,α,α',α'-tetramethylxylylene diisocyanate) and MPDI (2-methylpentane 1,5-diisocyanate).

4. A heat-curing coating material as claimed in claim 1, wherein the isocyanate prepolymer A is prepared using
   a) polyester polyols or polytetramethylene ether glycols and
   b) polyisocyanates based on IPDI (isophorone diisocyanate).

5. A heat-curing coating material as claimed in claim 1, comprising at least one auxiliary selected from the group consisting of stabilizers, catalysts, defoamers and leveling agents.

6. A heat-curing coating material as claimed in claim 1, wherein component A additionally contains urea groups.

7. A process for preparing a coatings on glass, which comprises applying a heat-curing coating material having a viscosity at 60° C. of 1000–50,000 mPas, to glass, the coating comprising
   A) 85–96% by weight of at least one isocyanate prepolymer containing isocyanurate groups and urethane groups,
   B) 4–12% by weight of finely divided melamine having a mean particle diameter of 1–30 μm, and
   C) 0–3% by weight of one or more auxiliaries.

8. The process of claim 7, wherein said glass is a glass bottle.

9. Glass coated with the heat-curing coating material of claim 1.

10. The glass of claim 9, wherein said coating material is in a cured state.

* * * * *